Figure 1:
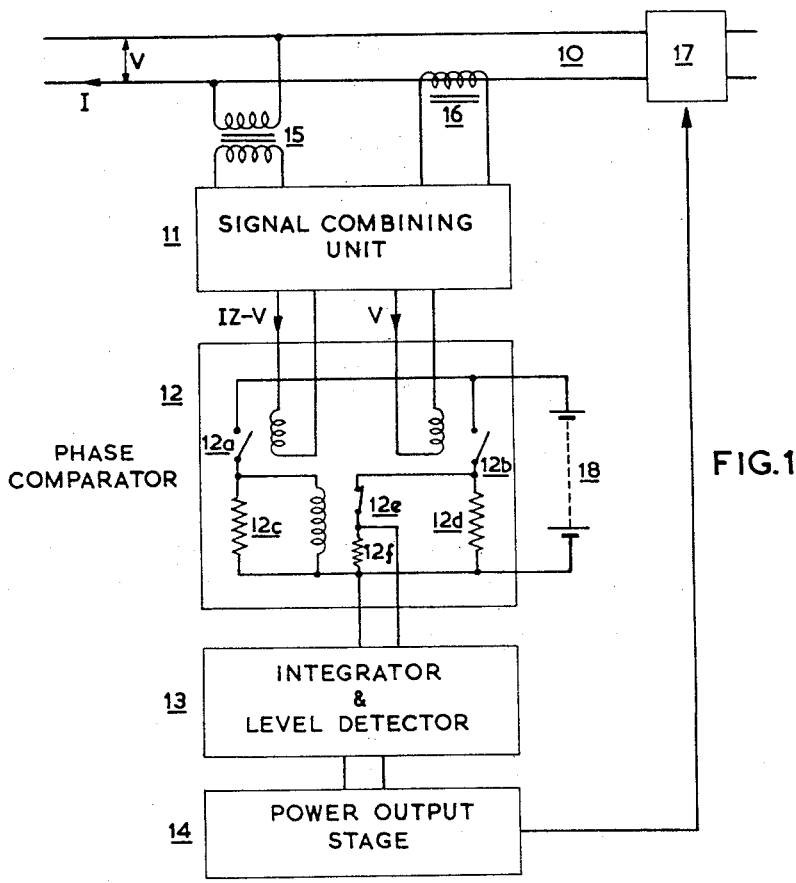

Sept. 20, 1960 J. WILLIS 2,953,722
ELECTRICAL PROTECTIVE RELAY SYSTEMS
Filed Jan. 13, 1958

Inventor:
John Willis
By:
Stevens, Davis, Miller + Mosher
Attorneys

United States Patent Office 2,953,722
Patented Sept. 20, 1960

2,953,722

ELECTRICAL PROTECTIVE RELAY SYSTEMS

John Willis, Luton, England, assignor to The English Electric Company Limited, London, England, a British company Filed Jan. 13, 1958, Ser. No. 708,662

Claims priority, application Great Britain Jan. 23, 1957

3 Claims. (Cl. 317—36)

This invention relates to electrical protective relay systems of the kind which utilize a phase comparator to control relay operation.

According to the invention, an electrical protective relay system comprises a protected alternating current circuit, transformer means connected to be energized from said circuit and adapted to produce two alternating current signals, a phase comparison of which determines a relay operating criterion, a phase comparator connected to the output from said transformer means and operative to effect the necessary phase comparison between the two signals, detector and relay operating means responsive to the output from the phase comparator, and a circuit interrupter in said protected circuit connected to be tripped by said detector and relay operating means when the relay operating criterion is satisfied, and said phase comparator comprises two switches in the form of variable impedance devices, and two additional coincidence detecting devices also in the form of variable impedance devices and each responsive to the positions of both said switches so that one detects a particular one of the four possible combinations of the alternative open and closed positions of the switches and the other detects the inverse combination, each said switch being controlled by a different one of said two alternating input signals according to the polarity of the signal, and the relay-operating output from the phase comparator comprising a component supplied from each coincidence detector having a duration proportional to the duration of the relevant coincidence per cycle, relay operation depending upon the magnitude of the sum of these two components. The four possible combinations of the two switches, denoted A and B respectively are (i) A open:B closed, (ii) A open:B open, (iii) A closed:B closed, (iv) A closed:B open. By "inverse combination" is meant the combination in which both switches have the opposite position. Thus, if one combination is open:closed, the inverse combination is closed:open. A system embodying the above preferred feature of the invention has particular application where D.C. offset effects are encountered.

It is to be understood that a variable impedance device by which is means here a device whose impedance can be controlled by an electrical control signal, can be used as a coincidence detector to detect the simultaneous occurrence of a signal which is directly applied to promote current flow through the device and a signal which is applied to control the impedance of the device. A simple electrical switch, for example, will carry current only when a circuit in which it is connected includes a source of E.M.F. and the switch is closed; a flow of current indicates that these two conditions are satisfied. In the embodiment of the invention to be described, however, the variable impedance devices take the form of transistors, though it is to be understood that other suitable electronic and magnetic devices fall within the scope of the invention.

Other features of the invention relate to the specific arrangements of the electrical circuits used in the phase comparator and the particular form and mode of connection of the variable impedance devices. These features will be apparent from the following description of the invention.

A typical relay system of the kind under consideration requires a phase comparison between two signals of the form V and IZ—V, where V is the voltage of a protected line, and I is the current in the line. For simplicity, a single phase system is considered. The term Z is a constant having the character of an impedance. The operating criterion of the relay system may be that the phase difference between the two signals should exceed 90°. To measure this phase difference it is convenient to measure the fraction of a complete cycle during which the signals are of opposite sign; if the signals are in phase this fraction is zero, if they are in anti-phase this fraction is unity, and if they are 90° out of phase the fraction is ½. The operating criterion of the relay system therefore reduces to a measurement of a polarity combination as between the two signals.

The value of this polarity combination measurement as an indication of phase angle is limited by the requirement that the two signals are simple periodic in form. Under the fault conditions usually causing relay operation D.C. offset effects occur. By working a phase comparator in response to the combined effects of two polarity coincidence detections the D.C. offset has little effect on the accuracy of the measurement unless the offset is very large. Transient D.C. offsets, which in practice have been found to occur in one only of the signals, have only a second order effect upon the accuracy of the measurement. It is important to note that this compensation for D.C. offset is only obtained provided two fractional components of the complete cycle are added. Four polarity combinations occur during a complete cycle. These are plus:minus, plus:plus, minus:minus, minus:plus. D.C. offset will increase one of the plus:minus, minus:plus components and decrease the other by a similar amount. By producing two signals having strengths proportional to the two distinct periods during a complete cycle of change for which the two input signals have opposite polarity and adding these signals D.C. offset effects are substantially eliminated. The strength of the resultant signal is a measure of the required phase difference.

Figure 2:
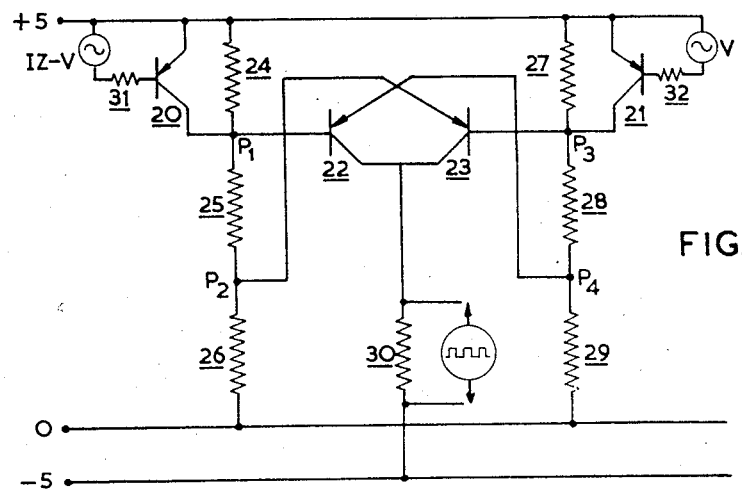

Instead of comparing the duration of periods during which the two input signals are of opposite sign with the duration of a complete cycle of change it is evidently possible to compare this with periods during which the polarities of the signals are the same. Phase differences in excess of 90° then correspond to the condition that the relevant fraction is less than one half. It is therefore a matter of convenience whether to detect polarity coincidence as between the same or opposite polarities. Furthermore, since one of the input signals can readily be converted to a signal in anti-phase it is also a matter of convenience whether the operating condition of the relay corresponds to coincidence in excess of or less than a predetermined fraction of the cycle. If D.C. offset effects can be ignored the general symmetry of the system makes it possible to utilize the coincidence of a single combination of polarities, for example, first signal positive, second signal negative. This will be readily understood from the following description with reference to the accompanying drawings in which:

Fig. 1 shows a schematic arrangement of a protective relay system which may be improved in its performance in response to D.C. offset action by incorporating a phase comparator embodying the invention, and Fig. 2 shows a transistor circuit arrangement of a phase comparator according to the invention.

Referring to Fig. 1 a single phase power line 10 is shown to be protected by a relay system which comprises a signal combining unit 11, a phase comparator 12, an integrator and level detector 13, and a power output stage 14. The relay system operates in response to input signals supplied by the voltage transformer 15 and the current transformer 16 both of which are energized from the power line 10. The relay system operates to detect a fault condition on the line and upon the occurrence of such a condition to trip a circuit interrupter 17 connected in the line.

The power line 10 forms a protected alternating current circuit and the combination of the signal combining unit 11 with the voltage transformer 15 and the current transformer 16 constitutes what may be termed transformer means adapted to produce two alternating current signals a phase comparison of which determines a relay operating criterion. The integrator and level detector 13 together with the output stage 14 are in effect detector and relay operating means which respond when the relay operating criterion is satisfied to trip the circuit interrupter 17.

The operating characteristic of the relay is governed by a phase comparison effected between two quantities having the form V and IZ—V respectively, where V is the voltage of the line 10, I is the current in the line and Z is a parameter having the character of an impedance. Relay operation is required when the phase difference between these two quantities exceed 90°.

The function of the signal combining unit 11 is to generate electrical signals which are representative of these two quantities, and operates in response to the output signals supplied by the transformers 15 and 16. The design of the unit may take a variety of forms and will be apparent to those versed in the appropriate art.

The function of the phase comparator 12 is to compare the input signals having the general form V and IZ—V and supplied as input from the unit 11. From the foregoing description it will be apparent that the necessary phase comparison can be effected, if D.C. offset effects are ignored, by measuring the fraction of a cycle during which, for example, one of the signals V and IZ—V is positive and the other negative. In the phase comparator 12 the polarities of the two quantities govern the positions of two switches 12a and 12b. Both of these switches are electro-magnetically operated and have operating coils which are energized respectively by the two output signals from the unit 11. The switches are such that when currents flow in the directions indicated by the arrow heads the switches are in their closed positions. Thus when the two quantities are simultaneously positive and have the directions indicated by the arrow heads, switches 12a and 12b are both closed. There is only one combination of polarities as between the two input quantities which corresponds to switch 12a being open and switch 12b being closed. This combination is that for which the quantity V is positive and the quantity IZ—V negative. The comparator 12 includes means for detecting this condition.

Each of the switches 12a and 12b has its contacts connected directly in series with a resistor, 12c and 12d respectively. The two series circuits so formed are connected in parallel and energized from a battery 18. Thus when a switch is closed the particular resistor connected in series with it has a potential drop between its ends. An electro-magnetically operated switch 12e serves to detect the simultaneous presence of a potential drop across the resistor 12d and the absence of a potential drop across the resistor 12c. To this end the operating coil of the switch 12e is connected directly across the resistor 12c and the system is such that it is only when this coil is not energized that the switch 12e is closed. The contacts of the switch 12e are connected in series with a resistor 12f and the series combination is connected directly across the resistor 12d. Thus, in operation, it is only when resistor 12d is energized and resistor 12c not energized that the resistor 12f carries current. The potential drop across this resistor 12f constitutes the output signal from the comparator; the presence of this signal indicates that the quantity V is positive and the quantity IZ—V negative.

The amplitude of the output signal from the phase comparator 12 is determined by the E.M.F. of the battery 18. Accordingly, the duration of the signal supplied by the comparator 12 is a direct measure of the period during which V is positive and IZ—V negative. This particular combination of polarities occurs once every cycle and the operating criterion of the relay is that the duration of the particular polarity coincidence indicated should exceed ¼ of a cycle. Relay operation, therefore, depends upon the value of the mean output signal supplied by the phase comparator. Any suitable means for measuring this mean output signal and comparing it with the appropriate level can be used to control the operation of the relay. However, for high speed operation a convenient controlling system takes the form of a biased integrating device and a level detector 13, a signal within the system increasing or decreasing according to the mean applitude of the output signal from the comparator 12 and relay operation occurring if a predetermined level is reached. Thus, the integrator and level detector 13 can be caused to supply an output signal when relay operation is required.

Normally only small electrical powers will be handled by the unit 11, the comparator 12 and the integrator and level detector 13. In practice, it will therefore usually be necessary to provide a power output stage 14 which takes the form of an amplifier and provides sufficient electrical power to trip the circuit interrupter 17 when required.

In the system shown in Fig. 1 each of the switches 12a and 12b opens and closes once every cycle. This means that the switches 12a and 12b need to operate at a frequency of the order of 50 times per second. The switch 12e must also be operated at this frequency. It is evidently desirable, therefore, for the switches to have the form of variable impedance devices such as thermionic tubes, transistors, transductors or the like. Thus in Fig. 2 where a modification of the comparator of Fig. 1 is shown, the switches have the form of transistors.

The comparator unit shown in Fig. 2 is essentially the same as that shown in Fig. 1 with the exception that it includes an additional switch device to provide D.C. offset compensation. Before describing the circuit of Fig. 2 in detail the necessary modification to the comparator shown in Fig. 1 for D.C. offset compensation will be described.

Referring again to Fig. 1, imagine a second electromagnetically operated switch to be connected between the junctions of switch 12a and resistor 12c and switch 12e and resistor 12f. Also, imagine the coil operating this switch to be connected in parallel with the resistor 12d. The operation of this switch may be taken to be analogous to that of switch 12e. In this case when resistor 12d is not energized the switch is closed and, provided switch 12a is closed at the same time, the resistor 12f is energized. The effect of this when taken in combination with the effect of the switch 12e is that the resistor 12f affords an output signal both when V is positive and IZ—V negative and when V is negative and IZ—V positive. The output signal in the phase comparator is, therefore, a measure of the fraction of a complete cycle during which the quantities V and IZ—V are of opposite sign. Such a modified comparator operates in response to the dual effect of a particular combination of polarities and the inverse combination. It will be understood from the principles already described that this double effect compensates to a substantial extent for any D.C. offset which there may be in V and/or IZ—V.

The circuit shown in Fig. 2 is a simple transistorization of the phase comparator in Fig. 1 when modified in the manner just described. Transistors 20, 21, 22 and 23 correspond respectively to switches 12a, 12b, 12e and the additional switch not referred to by number. The transistors are of the p-n-p junction type. In the circuit two resistor combinations are shown. The first of these combinations consists of three resistors 24, 25 and 26 connected in series and the second combination similarly consists of three series connected resistors 27, 28 and 29. Each resistor combination is connected across a 5-volt supply as shown. Considering the first resistor combination, the transistor 20 is connected as a variable impedance device in parallel with the resistor 24. As the transistor is controlled to have a high impedance, resistor 24 is fully effective in determining the current through resistors 25 and 26. Otherwise, with the transistor 20 conductive, resistor 25 is ineffective in limiting current flow through the resistors. Thus, depending upon the control of transistor 20 the potential of the junction $P_1$ between resistors 24 and 25 is either close to or appreciably less than 5 volts. The potential of the junction $P_2$ between resistors 25 and 26 is always less than that of the junction $P_1$, but increases or decreases in harmony with the potential of $P_1$. Transistor 21 together with resistors 27, 28 and 29 behave in an exactly similar manner, the junctions $P_3$ and $P_4$ corresponding to the junctions $P_1$ and $P_2$. The resistances of the resistors 24 to 29 are chosen so that when transistor 20 is non-conductive and transistor 21 is conductive, the potential of $P_4$ is greater than that of $P_1$. Similarly, when transistor 21 is conductive and transistor 20 non-conductive, the potential of $P_3$ is greater than that of $P_2$. Under these conditions the transistors 22 and 23 are respectively conductive and non-conductive since the bases of the transistors are connected respectively to junctions $P_1$ and $P_3$, the emitters of the transistors are connected respectively to the junctions $P_4$ and $P_2$, and the collectors are connected together and through a resistor 30 to a negative 5-volt potential source. For conditions in which transistors 20 and 21 are simultaneously conductive or simultaneously non-conductive the symmetrical character of the circuit ensures that the base potentials of the transistors 22 and 23 are greater than the emitter potentials. Consequently, both transistor 22 and transistor 23 are cut off under these conditions. Current only flows through the resistor 30 provided one of the transistors 20 and 21 is conductive and the other non-conductive. The states of conduction of the transistors 20 and 21 are determined by the polarities of two control signals IZ—V and V supplied respectively through resistors 31 and 32 to the base-emitter circuits of the two transistors. The output signal is derived as a potential drop across the resistor 30 and is only present when the two control signals IZ—V and V are of opposite polarity. The circuit shown in Fig. 2, therefore, performs the function necessary to allow it to be used as a phase comparator in a relay system having D.C. offset compensation.

To facilitate a simple appraisal of the operation of the circuit shown in Fig. 2 the circuit has been presented in a very simple form. In practice, it would be necessary to protect transistors 20 and 21 against damage from large input voltages. Protecting diodes to limit voltages applied to the transistors may be incorporated in the circuit in a manner readily apparent to those skilled in the transistor art.

It is further to be noted that the collectors of transistors 22 and 23 may be connected to separate resistors instead of a common resistor 30 and the outputs from these resistors being added, in effect, in some later stage of the circuit.

What I claim as my invention and desire to secure by Letters Patent is:

1. An electrical protective relay system comprising a protected alternating current circuit, transformer means connected to be energized from said circuit and adapted to produce two alternating current signals a phase comparison of which determines a relay operating criterion, a phase comparator connected to the output from said transformer means and operative to effect the necessary phase comparison between the two signals, detector and relay operating means responsive to the output from the phase comparator, and a circuit interrupter in said protected circuit connected to be tripped by said detector and relay operating means when the relay operating criterion is satisfied, said phase comparator comprising two switches in the form of variable impedance devices, and two additional coincidence detecting devices also in the form of variable impedance devices and each responsive to the positions of both said switches so that one detects a particular one of the four possible combinations of the alternative open and closed positions of the switches and the other detects the inverse combination, each said switch being controlled by a different one of said two alternating input signals according to the polarity of the signal, and the relay-operating output from the phase comparator comprising a component supplied from each coincidence detector having a duration proportional to the duration of the relevant coincidence per cycle, relay operation depending upon the magnitude of the sum of these two components.

2. An electrical protective relay system according to claim 1, which comprises a load resistor connected to be fully energized when the collector-emitter circuit of either of two transistors is conducting, these transistors being the said additional coincidence detecting devices, and the conductive condition of each said transistor being controlled by the combined effect of two other transistors, which form said switches and which are energized from a fixed voltage supply and controlled by said alternating input signals, the effect of one of the latter mentioned transistors being to control the base potential of one of the aforementioned transistors and the emitter potential of the other of the aforementioned transistors, and the effect of the other latter mentioned transistor being to control the emitter potential of the first said aforementioned transistor and the base potential of the second said aforementioned transistor.

3. An electrical protective relay system according to claim 2, in which the phase comparator has a symmetrical circuit configuration each half of it comprising a combination of three series-connected resistors energized from a fixed direct current voltage supply, and two p-n-p junction transistors, one of which has its emitter connected to the positive voltage end of the series resistor combination and its collector connected to the common connection of the two resistors at this end of the combination, and the other of which has its base connected to this common connection, its emitter connected to the common connection of the two resistors at the other end of the corresponding resistor combination in the other half of the symmetrical circuit, and its collector connected in common with the collector of the corresponding transistor in the other half of the symmetrical circuit to the said load resistor, the alternating current signals requiring phase comparison being applied to the base-emitter circuit of the transistors having emitters connected to the positive voltage ends of the resistor combinations.

References Cited in the file of this patent
UNITED STATES PATENTS 2,299,561    Bivens  ---------------- Oct. 20, 1942
2,804,578    Bergseth  -------------- Aug. 27, 1957